United States Patent [19]

Jahn

[11] Patent Number: 5,024,155
[45] Date of Patent: Jun. 18, 1991

[54] FINGER PROTECTING ELEMENT FOR CYLINDER NIP

[75] Inventor: Hans-Georg Jahn, Wiesenbach, Fed. Rep. of Germany

[73] Assignee: Heidelberger Druckmaschinen AG, Heidelberg, Fed. Rep. of Germany

[21] Appl. No.: 36,351

[22] Filed: Apr. 9, 1987

[30] Foreign Application Priority Data

Apr. 22, 1986 [DE] Fed. Rep. of Germany ....... 3613463

[51] Int. Cl.⁵ .............................................. B41F 33/00
[52] U.S. Cl. .................................... 101/216; 68/265; 100/53
[58] Field of Search ...................... 101/216, 232, 53; 68/264, 265

[56] References Cited

U.S. PATENT DOCUMENTS

| 1,547,484 | 7/1925 | Wuerpel | 68/264 |
| 1,722,822 | 7/1929 | Pestel | 68/265 |
| 2,369,404 | 2/1945 | Overly | 101/216 |
| 2,405,832 | 8/1946 | Johnson | 68/265 |
| 2,409,595 | 10/1946 | Shield | 68/264 X |
| 4,295,421 | 10/1981 | Abendroth et al. | 101/216 |
| 4,454,812 | 6/1984 | Johne et al. | 101/212 |
| 4,554,806 | 11/1985 | Hewins | 68/264 X |

FOREIGN PATENT DOCUMENTS 1561079  1/1970  Fed. Rep. of Germany .

Primary Examiner—Clifford D. Crowder
Attorney, Agent, or Firm—Herbert L. Lerner; Laurence A. Greenberg

[57] ABSTRACT

A combination of counter-rotating cylinders having a nip therebetween, and a device including a finger protecting element pivotally mounted at an end thereof on a shaft extending parallel to axes of the cylinders and disposed adjacent the cylindrical surfaces of the cylinders in a danger zone in front of the nip, the finger protecting element having a guide surface on a side thereof facing towards one of the cylinders, the guide surface beginning at the other and free end of the finger protecting element in vicinity of the nip.

8 Claims, 1 Drawing Sheet

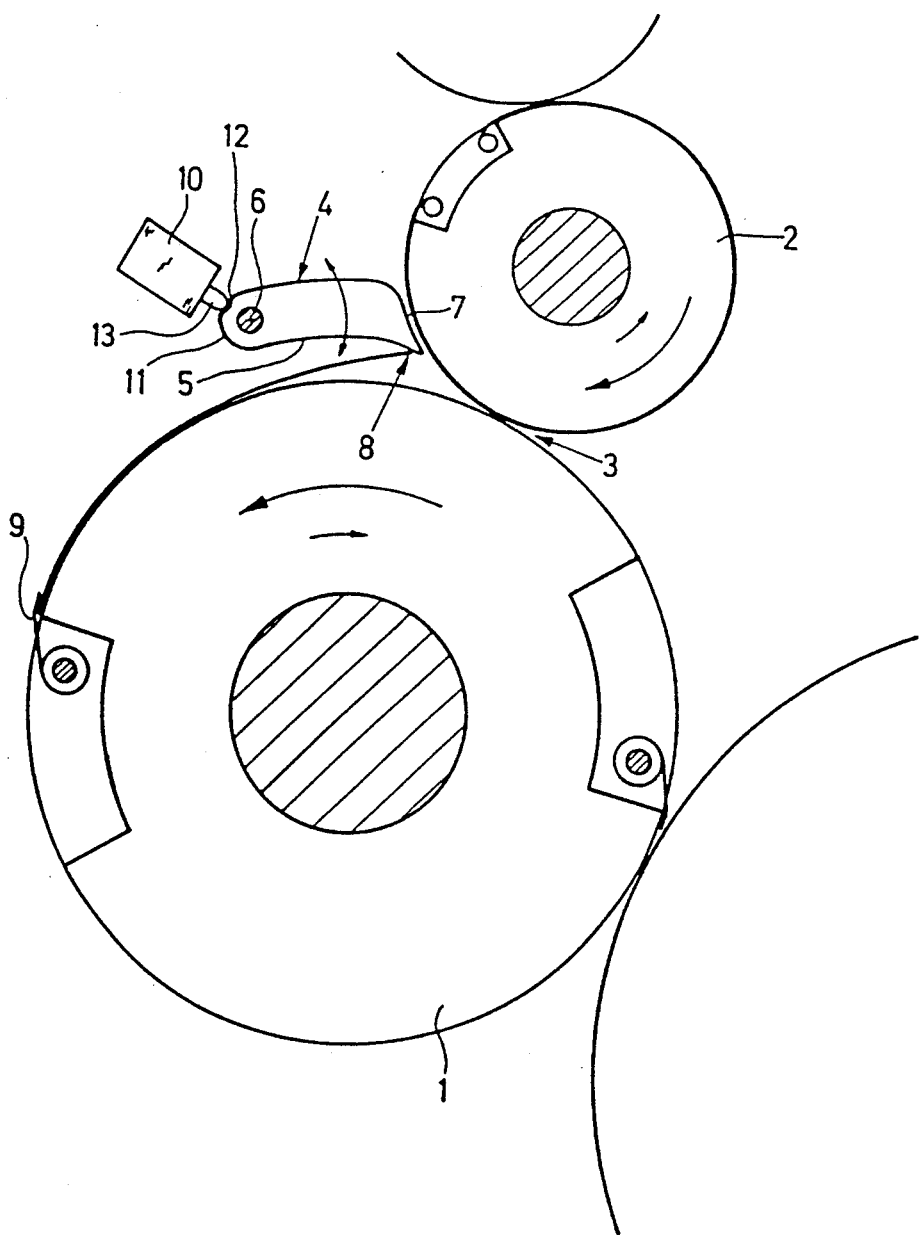

FINGER PROTECTING ELEMENT FOR CYLINDER NIP

The invention relates to a combination of counter-rotating cylinders, such as in printing machines, for example, with a device having a finger protecting or guard element arranged close to the surfaces of the cylinders.

A printing sheet applied to an impression cylinder is held by grippers at the leading edge thereof, so that the printing sheet can be conveyed without changing its relative position. The trailing end of the printing sheet is not held by grippers because it is not exposed to any force effects which would produce a change in the position of the sheet on the impression cylinder.

When printing sheets formed of material which is very stiff or which has great inherent or residual stress are used, the trailing sheet end can stand away from the impression cylinder. The instant the sheet leaves the nip between the counter-rotating cylinders, the sheet catapults the sheet end forward due to its inherent or residual stress. The sheet which has just been printed thus collides with a finger protecting or guard element, for example, such as is known from German Pat. No. 15 61 079. This collision between the printed sheet and the conventional finger guard or protecting element of the afore-described type causes the printing ink to be smeared from the printed sheet.

It is accordingly an object of the invention to provide, in combination with counter rotating cylinders having a nip therebetween, a device which has an effective finger guard or protecting element, yet prevents the printing ink from being smeared from the printed sheet by the finger guard element.

With the foregoing and other objects in view, there is provided, in accordance with the invention, in a combination with counter-rotating cylinders having a nip therebetween, a device comprising a finger protecting element pivotally mounted at an end thereof on a shaft extending parallel to axes of the cylinders and disposed adjacent the cylindrical surfaces of the cylinders in a danger zone in front of the nip, the finger protecting element having a guide surface on a side thereof facing towards one of the cylinders, the guide surface beginning at the other and free end of the finger protecting element in vicinity of the nip.

In regard to the foregoing construction, it is also noted that the space between the guide surface of the finger protecting element facing the one cylinder, which may be a sheet bearing cylinder, and the surface of the sheet bearing cylinder is of such width that only the trailing sheet end leaving the nip and being under inherent or residual stress touches the guide surface and is guided thereby.

In accordance with other features of the invention and, in order to achieve uniform guidance of the trailing sheet end during the entire sheet run or pass-through, the guide surface of the finger guard or protecting element is of concave construction and is disposed approximately equidistantly with respect to the circumference of the one cylinder or sheet bearing cylinder.

In accordance with additional features of the invention, the side of the finger guard or protecting element facing the other cylinder (blanket cylinder) is also of concave construction and is disposed approximately equidistantly with respect to the circumference of the other cylinder (blanket cylinder), thus permitting the finger guard element to be positioned very close to the blanket cylinder and close to the nip.

In accordance with concomitant features of the invention, the finger guard or protecting element is provided with a surface arranged concentrically with respect to the pivot axis of the finger protecting element and having a curved or cam-shaped depression formed therein. This cam-shaped depression forms a receiving location for a trigger or actuating element of a switch. When the finger guard element performs a pivoting movement, the position of the cam-shaped depression changes with respect to the stationary switch, whereby actuation of the switch occurs when its trigger element is suitably disposed in the curved or cam-shaped depression. Each predetermined pivoting movement of the finger guard element thus puts the printing machine out of operation.

Thus, besides providing an effective finger guard or protector, an advantage of the invention is to be seen in preventing a print or image-disrupting collision of the printed sheet with the finger guard element, when using rather stiff sheet materials, such as cardboard.

Other features which are considered as characteristic for the invention are set forth in the appended claims.

Although the invention is illustrated and described herein as embodied in a combination of counter-rotating cylinders with a device having a finger protecting or guard element arranged close to the surfaces of the cylinders, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single figure of the drawing, which is a diagrammatic side elevational view of a combination of counter-rotating cylinders having a nip therebetween with a device having a finger guard or protecting element.

Referring now to the drawing, there is shown, in an offset printing machine, a blanket cylinder 2 arranged above an impression cylinder 1. Instead of an impression cylinder, the cylinder 1 may be a transfer cylinder. A finger protecting or guard element 4 is positioned in front of a danger zone i. e. a zone in which an operator's finger might get caught in a nip between the cylinders 1 and 2, and level with the nip 3. This finger guard element 4 is provided with a surface 11 which is located concentrically to a shaft 6. Moreover, the surface 11 is formed with a curved or cam-shaped depression 12 for receiving therein a trigger or push-button element 13 of a switch 10.

The finger protecting or guard element 4 extends along substantially the entire length of the cylinders 1 and 2 and is formed with the same profile as seen at the end thereof in the figure. The shaft 6 like the unidentified shafts of the cylinders 1 and 2 are journalled in non-illustrated lateral walls of the printing machine. In case the finger guard element 4 performs a pivoting movement about the shaft 6 which is not in keeping with the conventional mode of operation thereof but is caused by contact with a foreign body (e.g. a finger or a cleaning instrument), the switch 10 is actuated to shut down the printing machine without delay. In this regard, the switch may be suitably connected in the current supply system to the machine.

Apart from the aforementioned protection against any interference which is unrelated to the conventional mode of operation, the finger protecting or guard element 4 fulfills another essential task, namely the guidance of the trailing sheet end.

The instant the trailing sheet end 8 which, contrary to the leading sheet end, is not held on the impression cylinder 1 by grippers 9, has passed the nip 3, the sheet, due to its inherent or residual stress, is catapulted into the vicinity of the starting end of the sheet guiding side 5 of the finger guard element 4 which is closest to the nip 3 and is then slowed down or braked. The side 5 of the finger guard element 4 which is formed to guide the sheet is equidistant from the circumference of the cylinder 1 and spaced approximately 30 mm away from the latter. The trailing sheet end 8 has the only surface of the sheet which comes into contact with the sheet guiding side 5 of the finger guard element 4, and only this trailing sheet end 8 glides along the sheet guiding side 5 during the sheet run or pass-through phase. There is thus no possibility of other partial surfaces of the printed sheet coming into contact with the sheet guiding side 5, so that smearing of the printing ink cannot occur.

I claim:

1. In combination, a printing machine with counter-rotating cylinders having a nip therebetween formed with a sheet inlet and a sheet outlet, and means for gripping a leading edge of a sheet and transporting the sheet from one of the cylinders to the other of the cylinders successively through the sheet inlet and the sheet outlet of the nip, and a device comprising a finger protecting element pivotally mounted at an end thereof on a shaft extending parallel to axes of the cylinders in a danger zone in front of the sheet outlet of the nip, said finger protecting element having a guide surface on a side thereof facing towards the other cylinder for guiding a displaced trailing edge of the sheet after the sheet has been transported from the one cylinder to the other, said guide surface beginning at the other and free end of the finger protecting element in vicinity of the sheet outlet of the nip and extending towards said pivotally mounted end, said guide surface being concave and being spaced from the other cylinder, said concave guide surface being disposed approximately equidistantly from the circumference of the other cylinder.

2. In combination, a printing machine with counter-rotating cylinders having a nip therebetween formed with a sheet inlet and a sheet outlet, and means for gripping a leading edge of a sheet and transporting the sheet from one of the cylinders to the other of the cylinders successively through the sheet inlet and the sheet outlet of the nip, and a device comprising a finger protecting element pivotally mounted at an end thereof on a shaft extending parallel to axes of the cylinders in a danger zone in front of the sheet outlet of the nip, said finger protecting element having a guide surface on a side thereof facing towards the other cylinder for guiding a displaced trailing edge of the sheet after the sheet has been transported from the one cylinder to the other, said guide surface beginning at the other and free end of the finger protecting element in vicinity of the sheet outlet of the nip and extending towards said pivotally mounted end, said finger protecting element being formed with a concave surface on a side thereof facing towards the one cylinder and approximately equidistant from the circumference of the one cylinder.

3. The combination according to claim 2, wherein said concave surface on said side of said finger protecting element facing towards the one cylinder is spaced only a few millimeters away from the other cylinder.

4. In combination, a printing machine with counter-rotating cylinders having a nip therebetween formed with a sheet inlet and a sheet outlet, and means for gripping a leading edge of a sheet and transporting the sheet from one of the cylinders to the other of the cylinders successively through the sheet inlet and the sheet outlet of the nip, and a device comprising a finger protecting element pivotally mounted at an end thereof on a shaft extending parallel to axes of the cylinders in a danger zone in front of the sheet outlet of the nip, said finger protecting element having a guide surface on a side thereof facing towards the other cylinder for guiding a displaced trailing edge of the sheet after the sheet has been transported from the one cylinder to the other, said guide surface beginning at the other and free end of the finger protecting element in vicinity of the sheet outlet of the nip and extending towards said pivotally mounted end, the device including a switch operatively engageable by said finger protecting element during a pivoting movement thereof for shutting down a machine to which the switch is connected and which includes the counter-rotating cylinders.

5. The combination according to claim 4 wherein said finger protecting element is formed with a surface concentric to said shaft, and said concentric surface is formed with a cam-shaped depression.

6. The combination according to claim 1, wherein the other cylinder is a sheet transfer cylinder.

7. The combination according to claim 6, wherein the one counter-rotating cylinder is a blanket cylinder.

8. The combination according to claim 1, wherein the other cylinder is an impression cylinder.

* * * * *